US012627590B1

(12) United States Patent
Freund et al.

(10) Patent No.: US 12,627,590 B1
(45) Date of Patent: May 12, 2026

(54) ENHANCED NETWORKING FOR HYBRID NETWORK

(71) Applicant: Amazon Technologies, Inc., Seattle, WA (US)

(72) Inventors: Brendan Freund, San Diego, CA (US); Daniel Lowing Spitler, San Francisco, CA (US); Ryan N. Thompson, Brooklyn, NY (US); Jasmine Louise Strong, San Francisco, CA (US); Mete Rodoper, Alameda, CA (US)

(73) Assignee: Amazon Technologies, Inc., Seattle, WA (US)

( * ) Notice: Subject to any disclaimer, the term of this patent is extended or adjusted under 35 U.S.C. 154(b) by 42 days.

(21) Appl. No.: 18/622,769

(22) Filed: Mar. 29, 2024

(51) Int. Cl.
G06F 15/173 (2006.01)
H04L 12/46 (2006.01)
H04L 45/02 (2022.01)

(52) U.S. Cl.
CPC .......... H04L 45/02 (2013.01); H04L 12/4641 (2013.01)

(58) Field of Classification Search
CPC ........................... H04L 45/02; H04L 12/4641
See application file for complete search history.

(56) References Cited

U.S. PATENT DOCUMENTS

| | | | | |
|---|---|---|---|---|
| 9,521,065 | B1 * | 12/2016 | Nuji | H04L 45/02 |
| 2011/0119401 | A1 * | 5/2011 | Kish | H04L 45/18 |
| | | | | 709/243 |
| 2018/0132174 | A1 * | 5/2018 | Strong | H04L 45/00 |
| 2018/0212863 | A1 * | 7/2018 | Akcan | H04W 40/246 |
| 2018/0227170 | A1 * | 8/2018 | Wang | H04L 41/5054 |
| 2019/0312787 | A1 * | 10/2019 | Ran | H04L 12/4641 |
| 2025/0220693 | A1 * | 7/2025 | Mishra | H04W 76/40 |

* cited by examiner

*Primary Examiner* — Duyen M Doan
(74) *Attorney, Agent, or Firm* — K&L Gates LLP

(57) ABSTRACT

Technologies directed to an approach to handling traffic on a hybrid network is described. The network of nodes may be organized as a first subnetwork having a first topology of wired and wireless connections and a second subnetwork having a second topology of wired and wireless connections. A node may wirelessly receive a first broadcast frame corresponding to the first subnetwork, The node may forward the first broadcast frame across a first wired connection based on a first identifier. The node may wirelessly receive a second broadcast frame corresponding to the second subnetwork. The node may forward the second broadcast frame across a second wired connection based on a second identifier.

20 Claims, 8 Drawing Sheets

```
┌────────────────────────────────────────────────────┐      400
│ Identify one or more nodes of a network of nodes,    │
│ the network of nodes organized as (i) a first        │
│ virtual local area network (VLAN) having a first     │
│ topology of wired and wireless connections within    │
│ the network and (ii) a second VLAN having a second   │
│ topology of wired and wireless connections within    │
│ the network 402                                      │
└────────────────────────────────────────────────────┘
                         │
                         ▼
┌────────────────────────────────────────────────────┐
│ Wirelessly receiving a first undesignated frame      │
│ corresponding to the first VLAN 404                  │
└────────────────────────────────────────────────────┘
                         │
                         ▼
┌────────────────────────────────────────────────────┐
│ Forward, in response to a determination that a       │
│ first identifier indicates that the first node is to │
│ forward wirelessly received undesignated frames      │
│ corresponding to the first VLAN, the first           │
│ undesignated frame across a first wired connection   │
│ of the first VLAN 406                                │
└────────────────────────────────────────────────────┘
                         │
                         ▼
┌────────────────────────────────────────────────────┐
│ Wirelessly receiving a second undesignated frame     │
│ corresponding to the second VLAN 408                 │
└────────────────────────────────────────────────────┘
                         │
                         ▼
┌────────────────────────────────────────────────────┐
│ Forward, in response to a determination that a       │
│ second identifier indicates that the first node is   │
│ to forward wirelessly received undesignated frames   │
│ corresponding to the second VLAN, the second         │
│ undesignated frame across a second wired connection  │
│ of the second VLAN 410                               │
└────────────────────────────────────────────────────┘
```

200

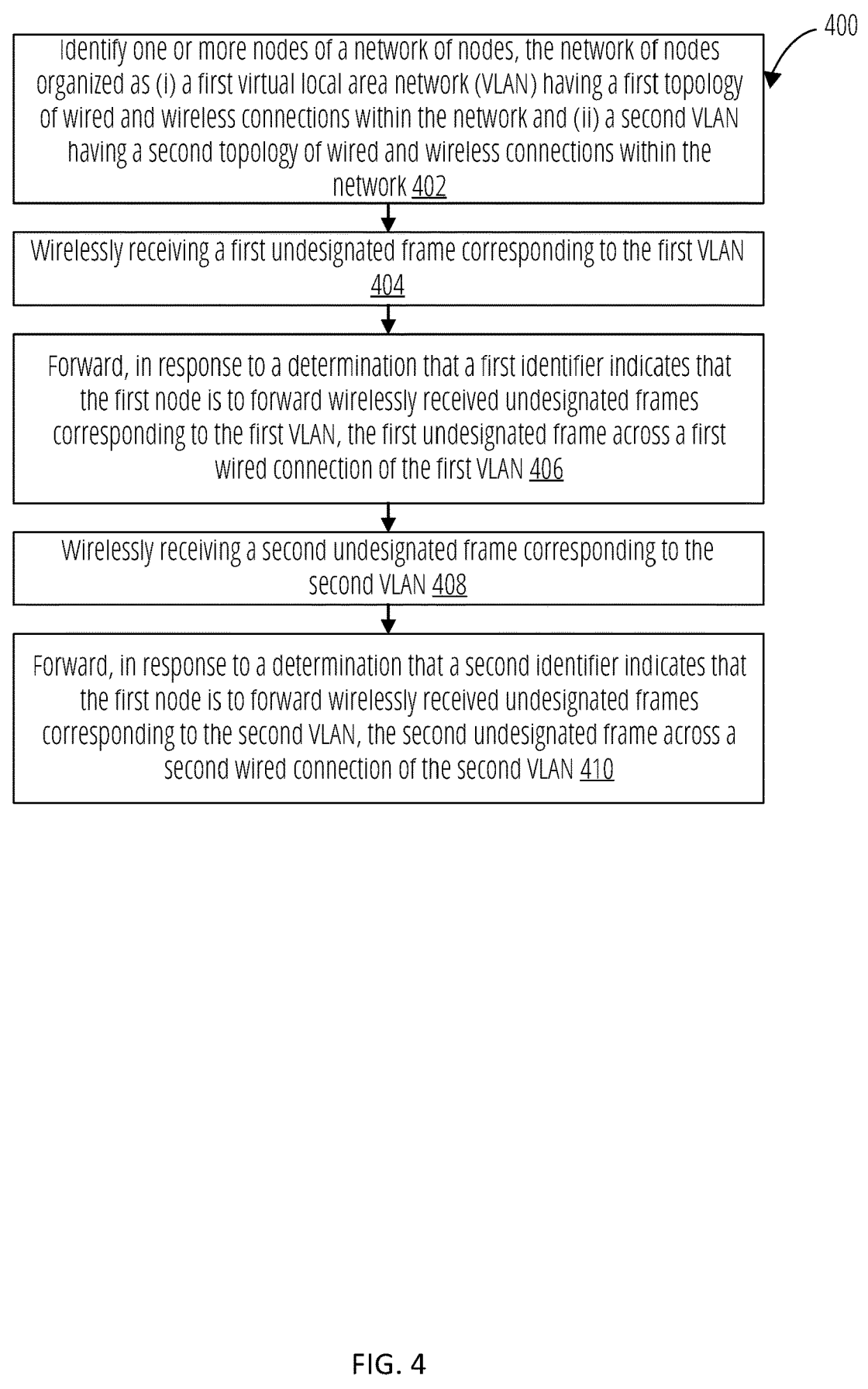

400

Identify one or more nodes of a network of nodes, the network of nodes organized as (i) a first virtual local area network (VLAN) having a first topology of wired and wireless connections within the network and (ii) a second VLAN having a second topology of wired and wireless connections within the network 402

Wirelessly receiving a first undesignated frame corresponding to the first VLAN 404

Forward, in response to a determination that a first identifier indicates that the first node is to forward wirelessly received undesignated frames corresponding to the first VLAN, the first undesignated frame across a first wired connection of the first VLAN 406

Wirelessly receiving a second undesignated frame corresponding to the second VLAN 408

Forward, in response to a determination that a second identifier indicates that the first node is to forward wirelessly received undesignated frames corresponding to the second VLAN, the second undesignated frame across a second wired connection of the second VLAN 410

FIG. 4

ENHANCED NETWORKING FOR HYBRID NETWORK

BACKGROUND

The modern internet has revolutionized communications by enabling computing devices to transmit large amounts of data quickly over incredibly vast distances. The rate of innovation set by application and web developers is breath-takingly fast, but unfortunately, not all aspects of the internet experience have kept pace. In particular, even as people rely more and more heavily on home networking solutions to enable internet connectivity for a rapidly increasing collection of electronic devices, the technology underpinning those solutions often provides a woefully inadequate user experience. In particular, many users find that a single wireless access point is not able to provide wireless coverage for an entire home or small business. While technology exists to extend the wireless network, it is often both difficult to configure and inefficient in performance. Thus, there is a need in the computer networking field to create new and useful systems and methods for enhanced mesh networking.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 4 is a flowchart illustrating a method of performing a forwarding decision, according to one embodiment.

DETAILED DESCRIPTION

Figure 1:
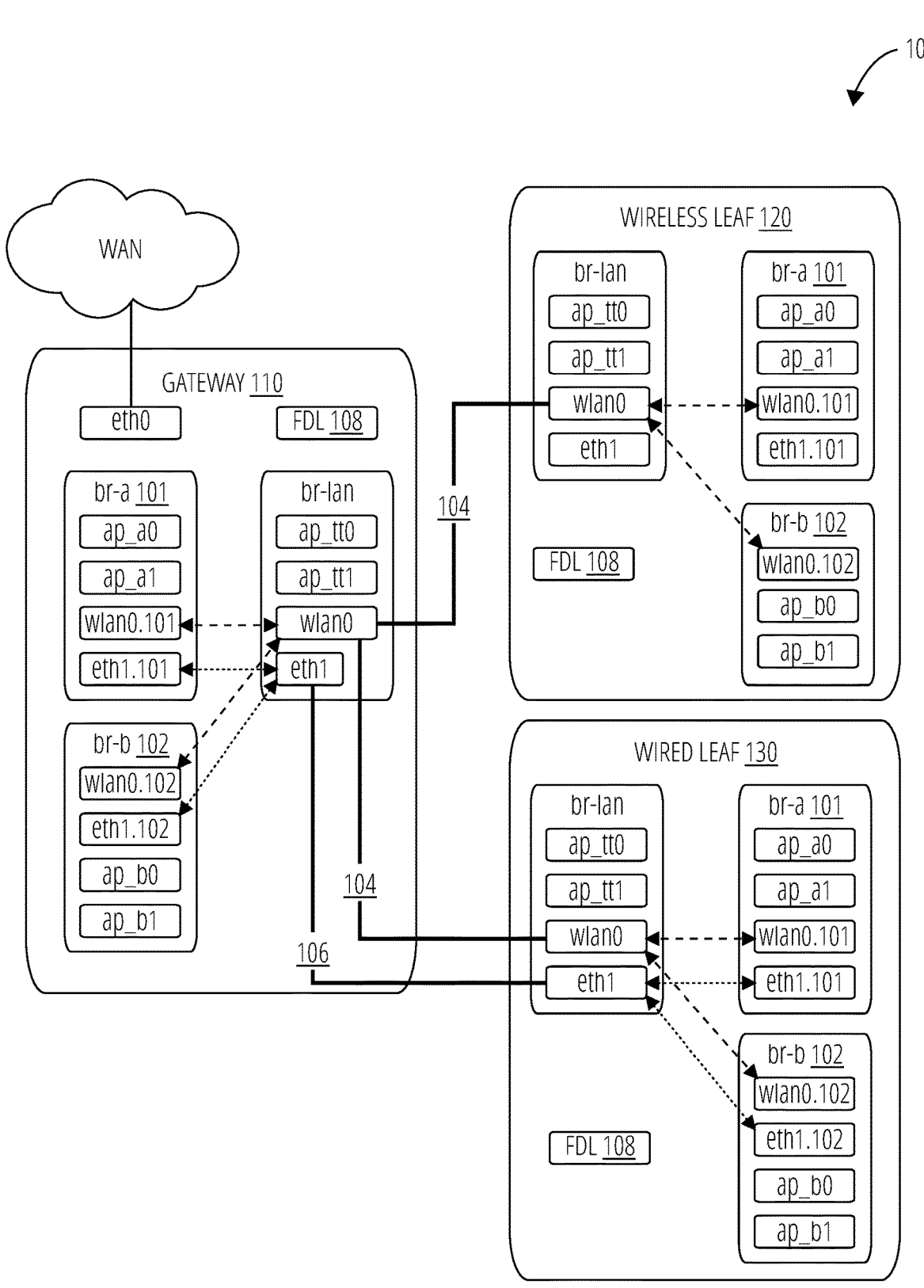
FIG. 1 is a block diagram of a hybrid network including a gateway, a wireless leaf, and a wired leaf, according to one embodiment.

Technologies directed to an approach to handling traffic on a hybrid network is described. A hybrid network may be defined as multiple nodes interconnected by both wired and wireless connections. Nodes within a hybrid network may be any device that can send, receive or forward information of a communication channel. Some examples of what the nodes may be are routers, modems, switches, wireless access points (WAPs), internet of things (IoT) devices, and end-user devices.

A common problem in hybrid networks having Ethernet devices with more than one Ethernet port, including switches, routers, bridges and client devices contain a structure generally referred to as an address resolution list (ARL) or forwarding database (FDB). These devices use this ARL or FDB in order to quickly determine which of their multiple ports leads to a given media access control (MAC) address of a node. Given that Ethernet frames only contain two addresses—destination and source—and the Ethernet protocol is connectionless, the only means of determining where a given node is located on an Ethernet network is by snooping the source address of frames coming from that port.

A traditional Ethernet switch, upon receiving a frame, compares it to the addresses currently in its ARL, and if it finds it, will then deliver it to the port noted in the ARL. If it does not find the frame, it will flood it to every port other than the one it came in on. Having done this, it notes that the source address on the frame is present on whichever port it came in on.

Some hybrid networks may include both discontiguous wireless mesh networks and Ethernet segments. This is problematic, because mesh networks may not guarantee to deliver frames to attached Ethernet segments in a deterministic fashion. This means that Ethernet switches may become confused by traffic that appears to come from random locations. Moreover, since nodes bordering both a mesh network and an Ethernet segment will see traffic (one or more frames) that has come from the mesh when it lands on the segment, they may decide to take the frames and inject them back into the mesh. This traffic then moves through the mesh and is reinserted back into the Ethernet segment repeatedly, causing the network to eventually become clogged by looping frames.

Problems of looping may be solved in wired Ethernet networks using the well-known Spanning Tree Protocol (STP). Unfortunately, since this works on a per-bridge-port basis, it is not well suited to meshes where a single bridge port may represent multiple peer links. Moreover, meshes may have intrinsically cyclic topologies, and derive many of their reliability benefits from the multiple paths allowed by such cyclic structures. Spanning Tree Protocol, which is designed to make a network acyclic, may not be a good fit for such networks, even if it is extended to handle mesh links on a per-peer-link basis. Additionally, because Ethernet protocol only allows for a small header, the problems of looping frames in wired Ethernet networks may not be solved using time-to-live (TTL) techniques.

Problems of looping frames may also be solved by an adjunct protocol called Segment Table Announced Mesh Protocol (STAMP) which builds upon facilities provided by the IEEE 802.11s mesh networking standard in order to make it possible to deterministically deliver frames from mesh networks to legacy IEEE 802.3 Ethernet clients. STAMP may determine a topology of the hybrid network. The topology of the hybrid network may identify how the nodes are interconnected (e.g., wired connection(s) or wireless connection(s)). Within the topology, STAMP may determine one or more segments of the hybrid network. Each segment may be a set of devices that are mutually connected by a homogeneous connection type (e.g., all devices of a wireless segment are connected by wireless links, all devices of an Ethernet segment are connected by Ethernet). STAMP may then designate a single node belonging to both a wireless segment and an ethernet segment to forward undesignated frames received from the wireless segment across the ethernet segment. As described herein, an undesignated frame is a frame with an unknown destination or more than one destination, such as a broadcast frame, a flooded unicast frame, an unknown unicast frame, and multicast frames. This designation prevents looping frames by causing undesignated frames sent from the wireless segment to be forwarded across the Ethernet segment in a deterministic fashion.

However, when a hybrid network includes virtual local area networks (VLANs), STAMP may not prevent looping frames within all subnets. Having STAMP enabled on a main network (e.g., br-lan) is not sufficient to prevent undesignated frames from looping within the different subnets. This may be because each of the different subnets may cause Ethernet devices to see subnet traffic in a nondeterministic fashion. Additionally, using STAMP on a hybrid network having multiple subnets may result in node(s) not receiving undesignated frames when they should. For example, if the Ethernet segment includes a switch that selectively forwards frames with a tag indicating a first subnet and drops frames with a tag indicating a second subnet (e.g., selective frame dropping), nodes downstream from designated forwarder node and the switch may not receive undesignated frames for the second subnet.

Aspects and embodiments of the present disclosure described herein address the problems and deficiencies described above and others by providing a subnet-aware (e.g., VLAN-aware) STAMP protocol that tracks topologies of each of the subnets of a network. The subnet-aware STAMP protocol may be performed by node(s) of the network. The node(s) may identify a topology for each subnet within the network. Each topology may include wired and wireless segment(s). The wired segments may include node(s) interconnected by wired connection(s), such as Ethernet. The wireless segments may include node(s) interconnected by a wireless mesh network.

One or more nodes may belong to both a wired segment and a wireless segment of a first topology. Of these nodes, a first node may be designated as a forwarder of undesignated frames having a tag identifying a first subnet (e.g., a first VLAN). Similarly, one or more nodes may belong to both a wired segment and a wireless segment of a second topology. Of these nodes, a second node may be designated as a forwarder of undesignated frames having a tag identifying a second subnet (E.g., a first VLAN).

Aspects and embodiments of the present disclosure provide a first device that identifies one or more devices of a network organized as a first VLAN having a first topology and a second VLAN having a second topology. The first device wirelessly receives a first undesignated frame corresponding to the first VLAN. The first device may wirelessly receive the first undesignated frame from a second device within a wireless segment of the first topology. The first device may determine that a first identifier indicates that the first device is to forward the received undesignated frames corresponding to the first VLAN. In at least one embodiment, the first device may determine that the first device is to forward only wirelessly received undesignated frames corresponding to the first VLAN. The first device may forward these undesignated frames across a first wired connection of the first VLAN. The first wired connection may be part of a wired segment of the first topology.

The first device wirelessly receives a second undesignated frame corresponding to the second VLAN. The first device may wirelessly receive the second undesignated frame from a third device within a wireless segment of the second topology. The second and third devices may or may not be a same device. The first device may determine that a second identifier indicates that the first device is to forward the received undesignated frames corresponding to the second VLAN. In at least one embodiment, the first device may determine that the first device is to forward only wirelessly received undesignated frames corresponding to the second VLAN. The first device may forward these undesignated frames across a second wired connection of the second VLAN. The first second connection may be part of a wired segment of the second topology. The first and second wired connections may or may not be a same wired connection. The wired segments of the first and second topologies may or may not be identical wired connections.

As described within, a hybrid network may be composed of nodes (electronic devices) interconnected by wired or wireless connections between them. A wired connection refers to a physical, communicative connection between two devices, such as Ethernet, and a wireless connection refers to a non-wired communicative connection between two devices, such as peer link(s). Additionally, the hybrid network may be organized into multiple distinct logical networks. These logical networks may be the VLANs as described herein. Each VLAN may have a separate topology of the connections of the hybrid network. Thus, as described within, connections of a VLAN may each correspond to a connection between nodes of the hybrid network. For example, a first wired connection of the first VLAN may refer to a wired connection of the hybrid network, and a second wired connection of the second VLAN may refer to the same wired connection (or a different wired connection) of the hybrid network.

FIG. 1 is a block diagram of a hybrid network 100 including a gateway 110, a wireless leaf 120, and a wired leaf 130, according to one embodiment. A wireless trunk 104 may connect the gateway 110 and wireless leaf 120. A wired trunk 106 may connect the gateway 110 and the wired leaf 130. In at least one embodiment, another wireless trunk 104 may also connect the gateway 110 and wired leaf 130. Each of the gateway 110, the wireless leaf 120, and the wired leaf 130 may be configured to receive and send traffic within at least two subnetworks (subnets). As illustrated, these subnets may be a first virtual local area networks (VLANs) 101 and a second VLAN 102.

The gateway 110 may connect the gateway 110 to a wide area network (WAN). Before sending egress traffic to either of the wireless leaf 120 or wired leaf 130, the gateway 110 may tag the egress traffic if previously untagged. The gateway 110 may tag this egress traffic as belonging to either the first VLAN 101 or the second VLAN 102. The gateway 110 may then send the VLAN-tagged traffic according to rules and protocols specific to the type of traffic. Similarly, before sending egress traffic to the gateway 110, the wireless leaf 120 and wired leaf 130 may tag the egress traffic if previously untagged.

One or more of the gateway 110, wireless leaf 120, and wired leaf 130 may include forwarding decision logic (FDL) 108. If the egress traffic is one or more undesignated frame(s) (e.g., a broadcast frame or a multi-cast frame), the FDL 108 may be used to decide (or determine) whether a node (e.g., gateway 110, wireless leaf 120, or wired leaf 130) is to forward the undesignated frame. As described herein, an undesignated frame is a frame with an unknown destination or more than one destination, or a frame with a known destination where the location of the destination is unknown, such as a broadcast frame, a flooded unicast frame, an unknown unicast frame, and multicast frames. The FDL 108 may at least partially base this decision on a topology of the VLAN corresponding to the undesignated frame(s). The FDL 108 may determine the topology of the VLAN using information gathered by the node from other nodes within the hybrid network 100. The topology of the VLAN may identify wired and wireless connection(s) capable of communicating VLAN traffic between nodes of the hybrid network 100. Within this topology, the FDL 108 may determine one or more segments of connection(s) and interconnected nodes. In one embodiment, each segment may be a set of devices that are mutually connected by a homogeneous connection type. For example, all nodes of a wireless segment may be connected by wireless links, and all nodes of a wired segment may be connected by wired connections. Here, the FDL 108 may then designate a single node belonging to both the wired and wireless segments to forward undesignated frames received from the wireless segment across the wired segment, or vice-versa. This designation may prevent looping frames by causing undesignated frames sent from the wireless segment to be forwarded across the wired segment in a deterministic fashion.

In another embodiment, each segment may be a set of devices that are mutually connected by connections of a same or similar level of sophistication. For example, all nodes of a non-Ethernet segment (e.g., first segment) may be connected by non-Ethernet means, and all nodes of an Ethernet segment (e.g., second segment) may be connected by Ethernet. Here, the FDL 108 may then designate a single node belonging to both the non-Ethernet and Ethernet segments to forward undesignated frames received from the non-Ethernet segment across the Ethernet segment, or vice-versa. This designation may prevent looping frames by causing undesignated frames sent from the wireless segment to be forwarded across the Ethernet segment in a deterministic fashion.

Each of the two VLANs 101, 102 may have different or same topologies of the hybrid network 100. In other words, the gateway 110, wireless leaf 120, wired leaf 130, corresponding connections (trunks 104, 106), and any other nodes or connections of the hybrid network 100 may be mapped to a different topology for each VLAN within the hybrid network 100. The topologies of subnets within a hybrid network are described in more detail below with respect to FIGS. 2-3D.

If one or more nodes is part of two segments, these two segments may be considered adjacent segments. The adjacent segments may have a boundary, which may be the nodes that belong to both of the adjacent segments. Multiple nodes may be part of adjacent segments. To elect a designated forwarder between the adjacent segments, the FDL 108 may perform a comparison of the metrics corresponding to nodes that belong to both of the adjacent segments. By comparing the metrics corresponding to these nodes, the FDL 108 may determine which node is to be elected the designated forwarder between the adjacent segments. These metrics may include a network segment centrality and/or connectivity metric (E.g., representing a strength or reliability of the node's connection to one or more of the adjacent segments). In some embodiments, each metric of these nodes are determined based on the peer links of the node (E.g., all wireless peer links within the wireless segment, all Ethernet peer links within an Ethernet segment, all peer links of any type, etc.), such as being equal to the sum of the bitrates of the peer links or equal to the number of peer links. In some embodiments, each metric of these nodes is determined based on one or more hybrid wireless mesh protocol (HWMP) metrics associated with the node. For example, a metric of a node can be equal to the average of the path metrics between the node and each other member of the wireless segment (E.g., simple average, load-weighted average, etc.). In some embodiments, the FDL 108 may use any other suitable metric to compare nodes belonging to both adjacent segments. The FDL 108 may determine the designated forwarder to be the node belonging to both adjacent segments with the best compared metrics. In embodiments where the FDL 108 periodically elects or verifies the designated forwarder, which node is elected as designated forwarder may change dependent on these compared metrics. For example, a node may be introduced or removed from the wireless segment, which may affect the compared metrics of at least one of the nodes belonging to the adjacent segments. This introduction or removal may lead to the FDL 108 electing a new designated forwarder. The FDL 108 may also elect a new designated forwarder for other reasons as well, such as if a wired segment is broken in two (e.g., an Ethernet connection between two portions of a wired segment is unplugged) or a node is becomes part of both of the adjacent segments or is removed from one of the adjacent segments (e.g., a number of nodes belonging to both of the adjacent segments has changed).

In some embodiments, as illustrated, each node of the hybrid network 100 may include the FDL 108 that determines whether the respective node is designated to forward undesignated frames (in one or both directions between segments). In these embodiments, each FDL 108 may generate (or update) an identifier (e.g., a value, a Boolean variable, or the like) within respective nodes that indicates whether the node is a designated forwarder between the adjacent segments. In other embodiments, a single node of the hybrid network 100 includes the FDL 108 and assigns each node within the hybrid network 100 as either a designated forwarder or a non-designated forwarder for each adjacent segment within the hybrid network 100. In these embodiments, this single node may generate or update identifiers that are sent to each respective node. As described herein, each node that has identifier(s) indicating whether the node is a designated forwarder between adjacent segments are considered FDL-enabled nodes.

In some embodiments, the designated forwarder may be primarily responsible for moving frames between the wireless and Ethernet segments (E.g., receiving frames from the wireless segment and transmitting them into the Ethernet segment, receiving frames from the Ethernet segment and transmitting them into the wireless segment, etc.). In one example, the designated forwarder is responsible for moving undesignated frames on the mesh onto the Ethernet segment, and for moving undesignated frames from the mesh (not already present on the Ethernet segment) onto the Ethernet segment. In order to determine whether an undesignated frame should be forwarded in this way, the designated forwarder may perform a lookup operation to see if the origin node of the undesignated frame is already a member of the same Ethernet segment; if it is, then we can assume that the origin node already injected the undesignated frame onto the Ethernet segment, and the designated forwarder can leave it alone. In another example, the designated forwarder is solely responsible for all inter-segment transmissions between the segments to which it is connected (e.g., the adjacent segments).

Other node(s) belonging to both adjacent segments that, per the FDL 108, are not the designated forwarder (e.g., nodes not designated as the forwarding device) may not perform inter-segment forwarding (e.g., forwarding between adjacent segments) for which the designated forwarding device is responsible. However, these node(s) can operate in any suitable manner. In one example, one of these node(s) can act as though it is two separate devices—one connected to the wireless segment and the other to the Ethernet segment—with no direct data link between them. In this example, transmissions received from the Ethernet segment will only be forwarded by the node within the Ethernet segment (E.g., to Ethernet devices connected to the node by Ethernet), and transmissions received from the wireless segment will only be forwarded by the node within the wireless segment (E.g., to wireless devices connected to the node by wireless links). In a second example, one of these node(s) can determine a private sub-segment of devices that are connected to the rest of a segment only by the node and that does not include a designated forwarding device (or, in stricter versions, including only devices that are connected to the rest of the network only by the node, or including only client devices connected directly to the node and to no other devices), wherein the node is a "chokepoint" between the sub-segment and the rest of the network, and can perform inter-segment forwarding only for the private sub-segment. For example, in this second example, in response to receiving a broadcast frame from the Ethernet segment, the node can forward the broadcast frame to its private sub-segment of the wireless segment (preferably recording that the broadcast frame was received and forwarded to the private sub-segment only). When the node subsequently receives the same broadcast frame from the wireless segment (E.g., after forwarding into the wireless segment by the designated forwarding device), the node may be configured to not forward the same broadcast frame to the private sub-segment, thereby preventing the devices of the private sub-segment from receiving the broadcast frame more than once.

Figure 2:
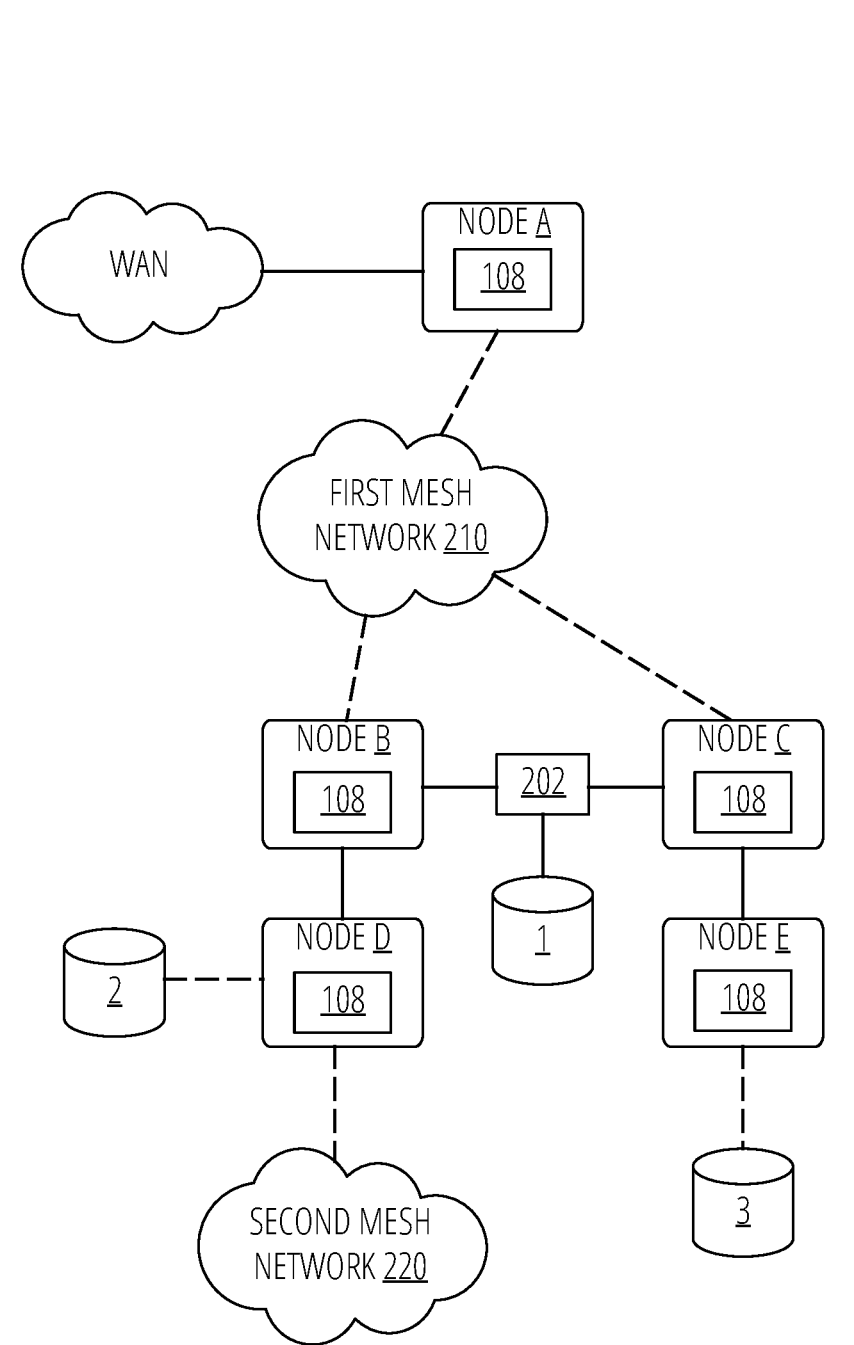
FIG. 2 is a block diagram of an exemplary hybrid network including discontiguous mesh networks and Ethernet connections, according to one embodiment.

FIG. 2 is a block diagram of an exemplary hybrid network 200 including discontiguous mesh networks 210, 220 separated by an Ethernet segment, according to one embodiment. In FIG. 2, the clouds (e.g., 210, 220) represent mesh networks and cylinders 1, 2, 3 represent client devices. FDL-enabled nodes A, B, C, D, E are represented by rounded rectangles and a legacy Ethernet switch 202 is shown as a rectangle. Each of the dotted lines represents a wireless connection (e.g., 802.11 wireless links) and each of the solid lines represents wired Ethernet connectivity.

As described above in FIG. 1, in some embodiments, each of the nodes A, B, C, D, E may include FDL 108 that generates respective designated forwarder identifier(s). In other embodiments, only one of the nodes may include the FDL 108 that generates a set of designated forwarder identifier(s) for each of the FDL-enabled nodes.

In at least one embodiment, node A is the gateway node, connected to both the internet (WAN) and the local network. Node A may be meshed with nodes B and C via the first mesh network 210. The first mesh network 210 may or may not include a number of intervening nodes between the nodes A, B, and C. All the Ethernet links in the network comprised by nodes B, C, D, and E are part of the same spanning tree domain. Nodes B and D may be separated from nodes C and E by the switch 202. If an additional Ethernet link were added between nodes C and D, the STP process would disable one of the ports in order to prevent loops.

Nodes D and E may not be in radio contact with nodes A, B or C. Node E may not be in radio contact with node D. Node D may be part of a second mesh network 220 that may or may not include additional nodes, and Node E may be part of a third mesh network (not illustrated) that may or may not include additional nodes.

Client device 1 may be wirelessly connected to nodes B and C via the switch 202. Client device 2 may be wirelessly connected to node D. Client device 3 may be wirelessly connected to node E.

While the hybrid network 200 may have a certain topology of wireless and Ethernet connections, if the hybrid network 200 includes at least two subnets (e.g., VLANs), one or more wireless or Ethernet connections between the FDL-enabled nodes may not be usable by a least one subnet. For example, if the switch 202 is configured to selectively (i) forward frames of a first VLAN and (ii) drops frames of a second VLAN (e.g., selective frame dropping), node B may be able to send frames of the first VLAN to node C via the switch 202 while also being prevented from sending frames of the second VLAN to node C via the switch 202. In situations like the example provided above, one or more subnets of the hybrid network 200 may have different topologies of wireless and Ethernet connections, which may result in looping frames. To remedy this, the FDL 108 may cause undesignated frames of different subnets to have different forwarding paths through the hybrid network 200 by (i) identifying the topologies (e.g., wireless and Ethernet segments) of each subnet and (ii) assigning FDL-enabled nodes to be designated forwarders based on those topologies. This is described in more detail below with respect to FIGS. 3A-D.

Figure 3A:
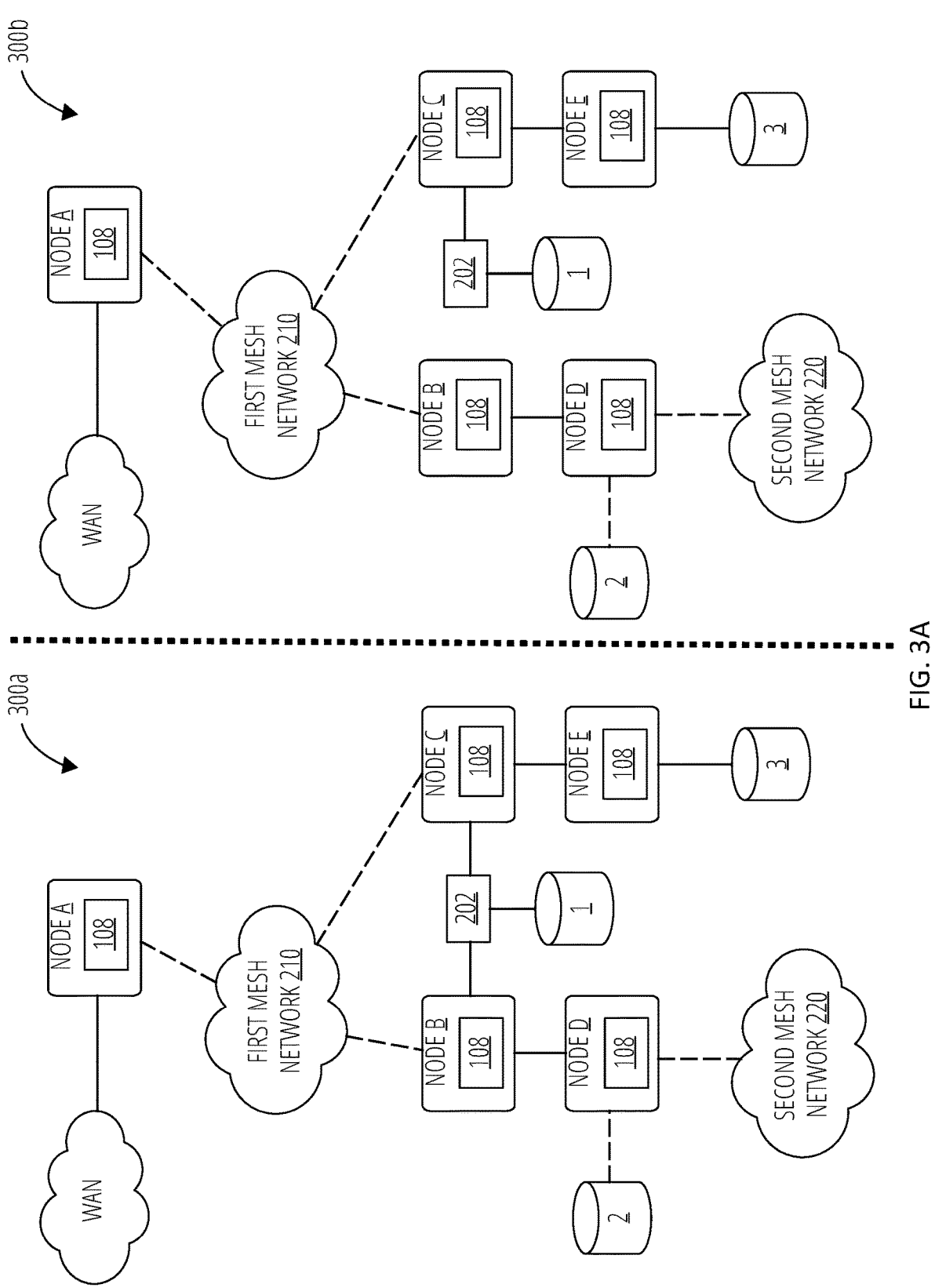
FIG. 3A includes block diagrams of the exemplary hybrid network illustrating a first topology of a first subnetwork and a second topology of a second subnet, according to one embodiment.

FIG. 3A includes block diagrams of the exemplary hybrid network 200 illustrating a first topology of a first subnetwork 300a and a second topology of a second subnetwork 300b, according to one embodiment. In at least one embodiment, the first subnet 300a is a first VLAN (e.g., first VLAN 101) and the second subnet 300b is a second VLAN (e.g., second VLAN 102). As illustrated, the legacy Ethernet switch 202 may configured to selectively (i) forward frames of the first subnet 300a and (ii) drops frames of the second subnet 300b as they are sent or forwarded from node B to node C.

Figure 3B:
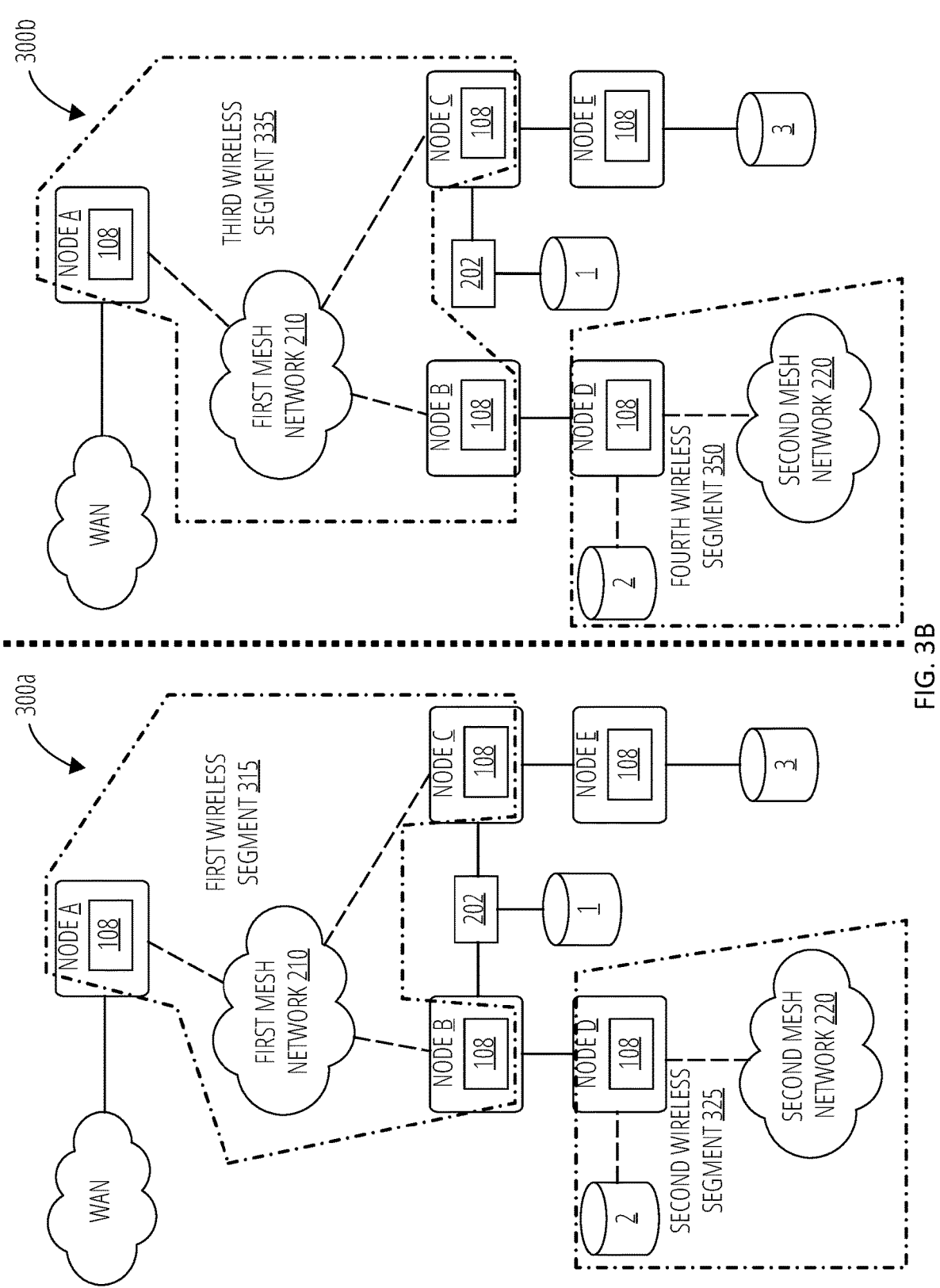
FIG. 3B includes block diagrams of the exemplary hybrid network illustrating wireless segments of the first topology of the first subnetwork and the second topology of the second subnetwork, according to one embodiment.

With respect to the first subnet 300a, node A may be meshed with nodes B and C via the first mesh network 210. The first mesh network 210 may or may not include a number of intervening nodes between the nodes A, B, and C. Thus, in at least one embodiment, the nodes A, B, and C may be part of a first wireless segment 315 as seen in FIG. 3B.

Figure 3C:
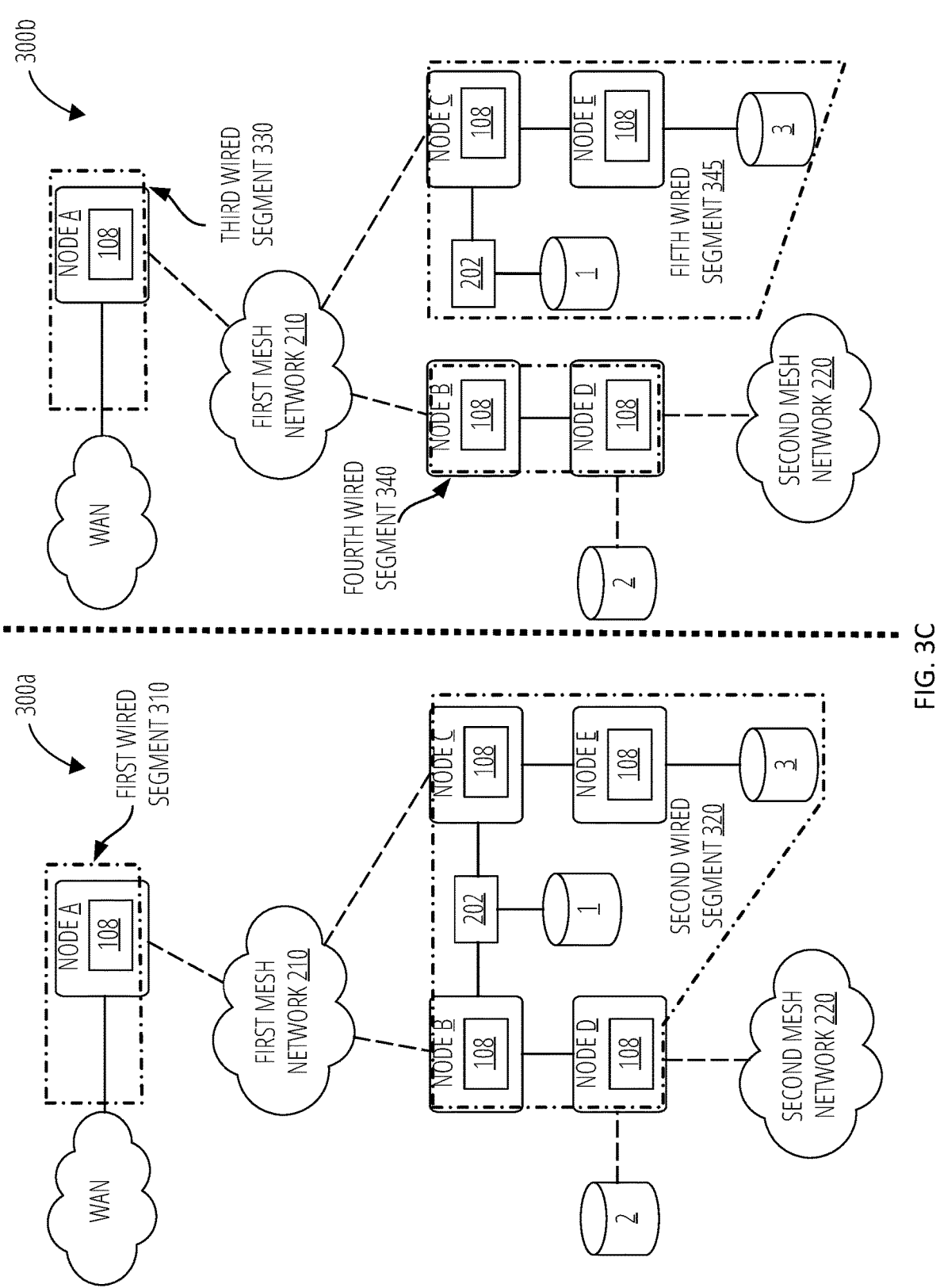
FIG. 3C includes block diagrams of the exemplary hybrid network illustrating wired segments of the first topology of the first subnetwork and the second topology of the second subnetwork, according to one embodiment.

All the Ethernet links in the network comprised by nodes B, C, D, and E are part of the same spanning tree domain. Nodes B and D may be separated from nodes C and E by the switch 202. This tree domain may be considered an Ethernet segment. Thus, in at least one embodiment, nodes B, C, D, and E may be part of a first wired segment 310 as seen in FIG. 3C.

Node D may not be in radio contact with nodes A, B or C. Node D may also not be in radio contact with node E. As such, node D may be part of a discontiguous second mesh network 220 that may or may not include additional nodes that are also not in radio contact with nodes A, B, or C. Thus, in at least one embodiment, node D is part of a second wireless segment 325 as seen in FIG. 3B.

Node E may not be in radio contact with nodes A, B or C. Node E may also not be in radio contact with node D. As such, node E may be part of an additional discontiguous mesh network (not illustrated) that may or may not include additional nodes that are also not in radio contact with nodes A, B, or C. Thus, in at least one embodiment, Node E may be part of another wireless segment (not illustrated).

Figure 3D:
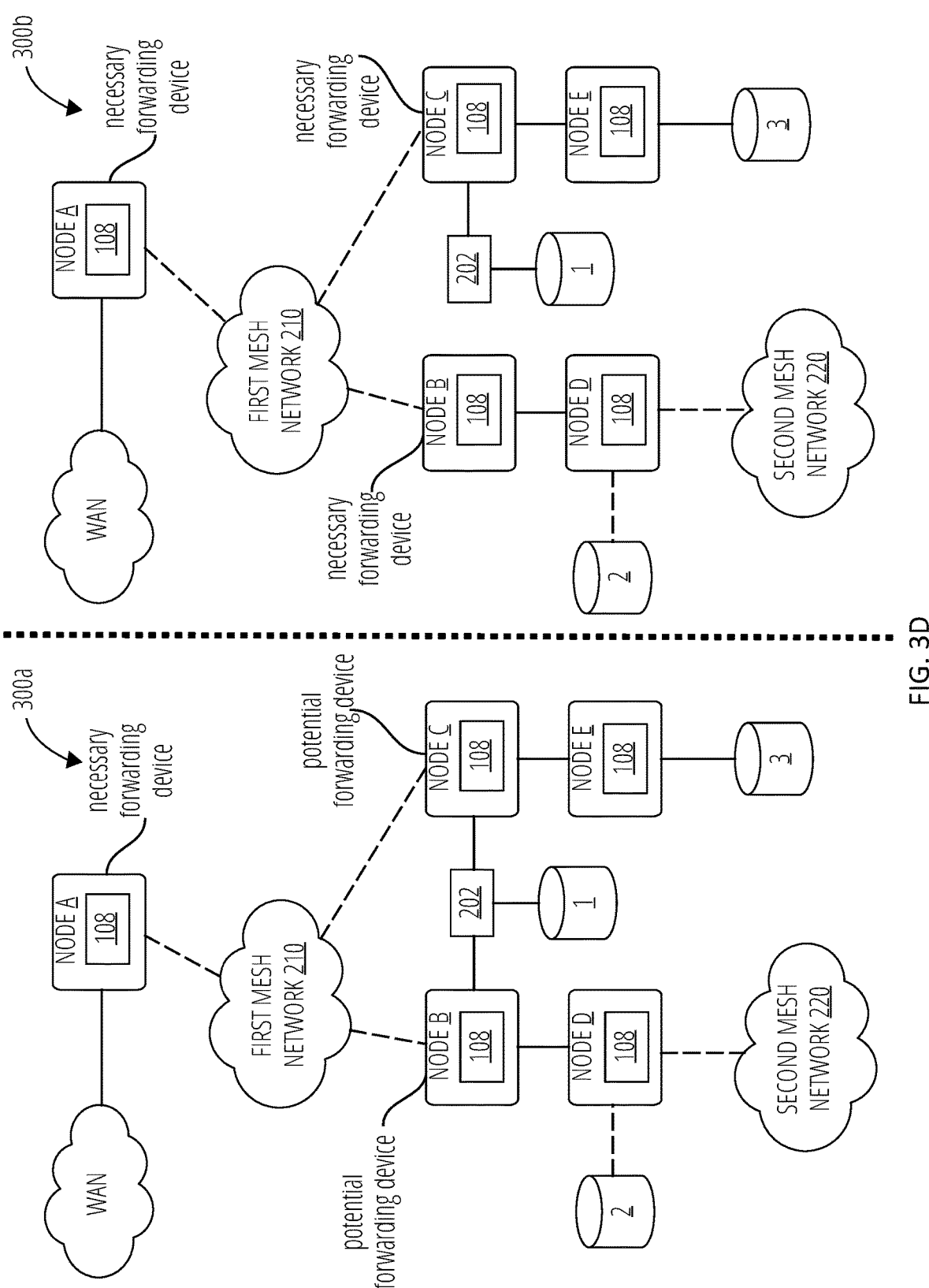
FIG. 3D includes block diagrams of the exemplary hybrid network illustrating potential and necessary forwarding nodes of the first topology of the first subnetwork and the second topology of the second subnetwork, according to one embodiment.

On the first wireless segment 315 of which nodes A, B and C are members, node A announces that it has an Ethernet segment of its own (i.e., first wired segment 310), and since it is the only member of the first wireless segment 315 which can contact the first wired segment 310, it may be elected designated forwarder for the mesh-Ethernet boundary between the first wired segment 310 and the first wireless segment 315. As such, node A may be considered a necessary designated forwarder as seen in FIG. 3D, as no other FDL-enabled node is connected to both the first wired segment 310 and the first wireless segment 315.

Nodes B and C both have connectivity to the first wireless segment 315 and the second wired segment 320, so they may announce this fact (to one or more other nodes of the hybrid network 200). Because either of the nodes B and C may be elected the designated forwarder between the first wireless segment 315 and the second wired segment 320, nodes B and C may be considered potential designated forwarders, as seen in FIG. 3D. In at least one embodiment, whichever node between nodes B and C has the best peer links to the first mesh network 210 is assigned (elected) designated forwarder by the FDL 108. For the sake of example, consider a situation where node C has better links and is therefore elected designated forwarder by the FDL 108 for this mesh-Ethernet boundary.

Node D, as illustrated, is the only FDL-enabled node connected to both the second wired segment 320 and the second wireless segment 325. As such, the FDL 108 may elect node D as the designated forwarder for undesignated frames between the second wired segment 320 and second wireless segment 325. Because node D is the only FDL-enabled node connected to both the second wired segment 320 and second wireless segment 325, node D may be considered a necessary designated forwarder as seen in FIG. 3D. Similarly, because node E is the only FDL-enabled node connected to both the Ethernet segment and the other wireless segment (not illustrated), the FDL 108 may elect node E as the designated forwarder for undesignated frames between the second wired segment 320 and the other wireless segment (not illustrated).

With respect to the first subnet 300a, if client 2 sends a first broadcast frame, node D receives it and forwards it other node(s) (if any) to the second wireless segment 325, any other clients of its access point, and the other nodes of the second wired segment 320 (i.e., nodes B, C, and E). Nodes B, C, and E receive the first broadcast frame, as does client 1. Node B receives the first broadcast frame and forwards it to node C and any client devices connected to its access point that are connected to the first subnet 300a. However, in this example, node B has not been elected the designated forwarder for the boundary between the first wireless segment 315 and second wired segment 320, and so node B does not forward the first broadcast frame to the first wireless segment 315. Instead, the FDL 108 has elected node C as the designated forwarder between the first wireless segment 315 and the second wired segment 320, and so Node C forwards the first broadcast frame to node E, any client devices connected to its access point that are connected to the first subnet 300a, and across the first wireless segment 315. Node A thereby receives the first broadcast frame from node B across the first wireless segment 315 and forwards the first broadcast frame to its own Ethernet segment and any connected client devices that are connected to the first subnet 300a, which node A may not have (as Node A is a gateway, such as gateway 110 of FIG. 1).

As another example, if node A originates a second broadcast frame (e.g., a dynamic host configuration protocol (DHCP) discovery request), node A forwards the second broadcast frame across the first wireless segment 315. Nodes B and C thereby receive the second broadcast frame from node A across the first wireless segment 315. Node B may forward the second broadcast frame to any client devices connect to its access point that are connected to the first subnet 300a, but because node C has been elected the designated forwarder between the first wireless segment 315 and the second wired segment 320, does not forward the second broadcast frame to node D. Instead, node C is the designated forwarder between the first wireless segment 315 and second wired segment 320, node C forwards the second broadcast frame to nodes B and D and client device 1 via the switch 202 and to node E. Nodes B, D and E then forward the second broadcast frame to any devices connected to their respective access points that are connected to the first subnet 300a (e.g., client devices 2 and 3). In this way, the switch 202 and any other Ethernet devices between nodes B, C, D and E within the second wired segment 320 always receive traffic from the same source along the same vector. By always sending traffic from the same node of a wired (e.g., Ethernet) segment, Ethernet devices do not mislearn the location of the source.

With respect to the second subnet 300b, node A may be meshed with nodes B and C via the first mesh network 210. The first mesh network 210 may or may not include a number of intervening nodes between the nodes A, B, and C. Thus, in at least one embodiment, the nodes A, B, and C may be part of a third wireless segment 335 as seen in FIG. 3B. The third wireless segment 335 may be the same or similar to the first wireless segment 315 of the first subnet 300a.

However, with the switch 202 selectively dropping frames of the second subnet 300b as they are sent or forwarded from node B to node C, nodes B and D may be part of a fourth wired segment 340 and nodes C and E may be part of a fifth wired segment 345, as seen in FIG. 3C. Thus, even though the overall topology of the hybrid network 200 may indicate that nodes A, B, C, and D are all part of a same spanning Ethernet tree domain, the FDL 108 can group these nodes differently for each subnet depending on their respective topologies.

Node D may not be in radio contact with nodes A, B or C. Node D may also not be in radio contact with node E. As such, node D may be part of a discontiguous second mesh network 220 that may or may not include additional nodes that are also not in radio contact with nodes A, B, or C. Thus, in at least one embodiment, node D is part of a fourth wireless segment 350 as seen in FIG. 3B. The fourth wireless segment 350 may be the same or similar to the second wireless segment 325 of the first subnet 300a.

Node E may not be in radio contact with nodes A, B or C. Node E may also not be in radio contact with node D. As such, node E may be part of an additional discontiguous mesh network (not illustrated) that may or may not include additional nodes that are also not in radio contact with nodes A, B, or C. Thus, in at least one embodiment, Node E may be part of another wireless segment (not illustrated).

On the third wireless segment 335 of which nodes A, B and C are members, node A announces that it has an Ethernet segment of its own (i.e., third wired segment 330), and since it is the only member of the third wireless segment 335 which can contact the third wired segment 330, it may be elected designated forwarder of undesignated frames for the mesh-Ethernet boundary between the third wired segment 330 and the third wireless segment 335. As such, node A may be considered a necessary designated forwarder as seen in FIG. 3D, as no other FDL-enabled node is connected to both the third wired segment 330 and the third wireless segment 335.

As illustrated, node B is the only FDL-enabled node that is part of the third wireless segment 335 and fourth wired segment 340. Since node B is the only member of the fourth wired segment 340 that can communicate with the third wireless segment 335, it may be elected designated forwarder of undesignated frames for the mesh-Ethernet boundary between the third wireless segment 335 and the fourth wired segment 340. As such, node B may be considered a necessary designated forwarder as seen in FIG. 3D, as no other FDL-enabled node is connected to both the third wireless segment 335 and fourth wired segment 340.

As illustrated, node C is the only FDL-enabled node that is part of the third wireless segment 335 and fifth wired segment 345. Since node C is the only member of the fifth wired segment 345 that can communicate with the third wireless segment 335, it may be elected designated forwarder of undesignated frames for the mesh-Ethernet boundary between the third wireless segment 335 and the fifth wired segment 345. As such, node B may be considered a necessary designated forwarder as seen in FIG. 3D, as no other FDL-enabled node is connected to both the third wireless segment 335 and fifth wired segment 345.

Node D, as illustrated, is the only FDL-enabled node connected to both the fourth wired segment 340 and the fourth wireless segment 350. As such, the FDL 108 may elect node D as the designated forwarder of undesignated frames between the fourth wired segment 340 and fourth wireless segment 350. Because node D is the only FDL-enabled node connected to both the fourth wired segment 340 and the fourth wireless segment 350, node D may be considered a necessary designated forwarder as seen in FIG. 3D. Similarly, because node E is the only FDL-enabled node connected to both the Ethernet segment and the other wireless segment (not illustrated), the FDL 108 may elect node E as the designated forwarder for undesignated frames between the fifth wired segment 345 and the other wireless segment (not illustrated).

With respect to the second subnet 300b, if client 2 sends a third broadcast frame, node D receives it and forwards it other node(s) (if any) in the fourth wireless segment 350, any other clients of its access point connected to the second subnet 300b, and the other node of the fourth wired segment 340 (i.e., node B). Nodes B receives the third broadcast frame and, because node B is the only FDL-enabled node belonging to both the fourth wired segment 340 and the third wireless segment 335, forwards the third broadcast frame across the third wireless segment 335. Node A thereby receives the third broadcast frame from node B across the third wireless segment 335 and forwards the third broadcast frame to the third wired segment 330 and any connected client devices that are also connected to the second subnet 300b, which node A may not have. Node C also receives the third broadcast frame from node B across the third wireless segment 335 and forwards the third broadcast frame across the fifth wired segment 345, as node B is the only FDL-enabled node belonging to both the third wireless segment 335 and fifth wired segment 345. Node B may also forward the third broadcast message to any connected client devices corresponding to the second subnet 300b, such as client device 1 via the switch 202. Node E may receive the third broadcast message from node C and send the third broadcast message to any connected client devices corresponding to the second subnet 300b.

It can be seen that because, for each subnet of a network, the FDL 108 only requires nodes to know about (i) the wired (e.g., Ethernet) segment they are a member of, and (ii) the wireless (e.g., mesh) segment they are a member of, functionality of the FDL 108 can be scaled without limit, and will not present a problem for very large networks. Because it guarantees that frames are delivered to wired Ethernet along the same vector every time, it does not require modifications to legacy Ethernet systems in order to work properly in connection with mesh networks. This is very different from protocols which guarantee determinism by forcing central configuration decisions to be made. In those systems, some central point must make decisions that affect the entire network, and there must be a scheme for communicating that information to every node in the network.

In keeping with the intrinsically decentralized, indefinitely scalable nature of mesh networks, the FDL 108 may achieve a similar level of performance without requiring any central authority or source of truth. As a consequence, disruptions caused by the failure of any particular node to correctly apply the protocol are limited in scope; even incorrectly injected frames will only affect a single Ethernet segment. As long as the nodes at the edges of a segment are correctly applying or identifying VLAN tags, any looping or stochastic delivery will be localized to the region served by the noncompliant node. This makes the network resilient to failures of communication between FDL-enabled nodes.

Upon receiving a notice of topology change of either the first subnet 300a or the second subnet 300b (e.g., a new FDL-enabled node as joined the network, an Ethernet switch recently began selectively dropping frames of the subnet, peer link metrics of an elected designated forwarder have decreased, or the like), nodes announce the new information on the usual schedule. Each node starts announcing the new information as soon as it's found, and since the FDL-enabled nodes are each indexed by a unique identifier (e.g., a bridge MAC address) within the FDL 108, the new information replaces the old within a few seconds. Stale information may be handled by the simple expedient of expiring it after a few update periods.

In some embodiments, FDL-enabled nodes may refresh metrics used to elect designated forwarders periodically. The FDL 108 may perform operations to either verify or change which FDL-enabled node is elected at each mesh-Ethernet boundary once or repeatedly (e.g., periodically, sporadically, in response to trigger occurrence, etc.), with any suitable timing. For example, FDL-enabled node metrics may be broadcast in announcements (e.g., periodically, such as every 15 seconds, in response to metric and/or segment updates, or the like), and new designated forwarders can be determined based on those announcements (e.g., periodically, such as determined at the same periodic rate, in response to receipt of the announcements, or the like).

In some embodiments, each FDL-enabled node may store one or more tables identifying nodes within local segments. For example, node B may store information about (i) which nodes (e.g., a first set of nodes) are part of the first wireless segment 315 (e.g., in a first table), (ii) which nodes (e.g., a second set of nodes) are part of the second wired segment 320 (e.g., in a second table), (iii) which nodes (e.g., a fourth set of nodes) are part of the third wireless segment 335 (e.g., in a third table), (iv) which nodes (e.g., a fifth set of nodes) are part of the fourth wired segment 340 (e.g., in a fourth table), and (v) metrics corresponding to each of these nodes used by the FDL 108 to elect a first designated forwarder between the first wireless segment 315 and the second wired segment 320 and a second designated forwarder between the third wireless segment 335 and the fourth wired segment 340. The information identifying which nodes belong to the first wireless segment 315 and the second wired segment 320 may be used to determine which nodes belong to both the first wireless segment 315 and the second wired segment 320 (e.g., a third set of nodes). The information identifying which nodes belong to the third wireless segment 335 and the fourth wired segment 340 may be used to determine which nodes belong to both the third wireless segment 335 and the fourth wired segment 340 (e.g., a sixth set of nodes). The first and second designated forwarders may be a same FDL-enabled node, such as is described above with respect to node C.

As another example, node C may store information about (i) which nodes are part of the first wireless segment 315, (ii) which nodes are part of the second wired segment 320, (iii) which nodes are part of the third wireless segment 335, (iv) which nodes are part of the fifth wired segment 345, and (v) metrics corresponding to each of these nodes used by the FDL 108 to elect a first designated forwarder between the first wireless segment 315 and the second wired segment 320 and a second designated forwarder between the third wireless segment 335 and the fifth wired segment 345. Each FDL-enabled node may store this information about nodes within local segments using tables or any other software storage technique.

FIG. 4 is a flowchart illustrating a method 400 of performing a forwarding decision, according to one embodiment. The method 400 may be performed by processing logic that may comprise hardware (E.g., circuitry, dedicated logic, programmable logic, microcode, etc.), software (E.g., instructions run on a processing device to perform hardware simulation), firmware, or a combination thereof. In at least one embodiment, computer readable media may store processor executable instructions which, when executed using the processing logic, cause the method 400 to be performed. In some embodiments, the method 400 may be performed by an electronic device (e.g., node, networking device) within a mesh network, such as is described above with respect to FIGS. 1-3D, or the wireless device 500 of FIG. 5. The method 400 can be performed by other devices described herein.

At block 402, the processing logic may identify one or more nodes of a network of nodes, the network of nodes organized as (i) a first virtual local area network (VLAN) having a first topology of wired and wireless connections within the network and (ii) a second VLAN having a second topology of wired and wireless connections within the network.

At block 404, the processing logic may wirelessly receive a first undesignated frame corresponding to the first VLAN.

At block 406, the processing logic may forward, in response to a determination that a first identifier indicates that the first node is to forward wirelessly received undesignated frames corresponding to the first VLAN, the first undesignated frame across a first wired connection being used for the first VLAN.

At block 408, the processing logic may wirelessly receive a second undesignated frame corresponding to the second VLAN.

At block 410, the processing logic may forward, in response to a determination that a second identifier indicates that the first node is to forward wirelessly received undesignated frames corresponding to the second VLAN, the second undesignated frame across a second wired connection being used for the second VLAN.

Figure 5:
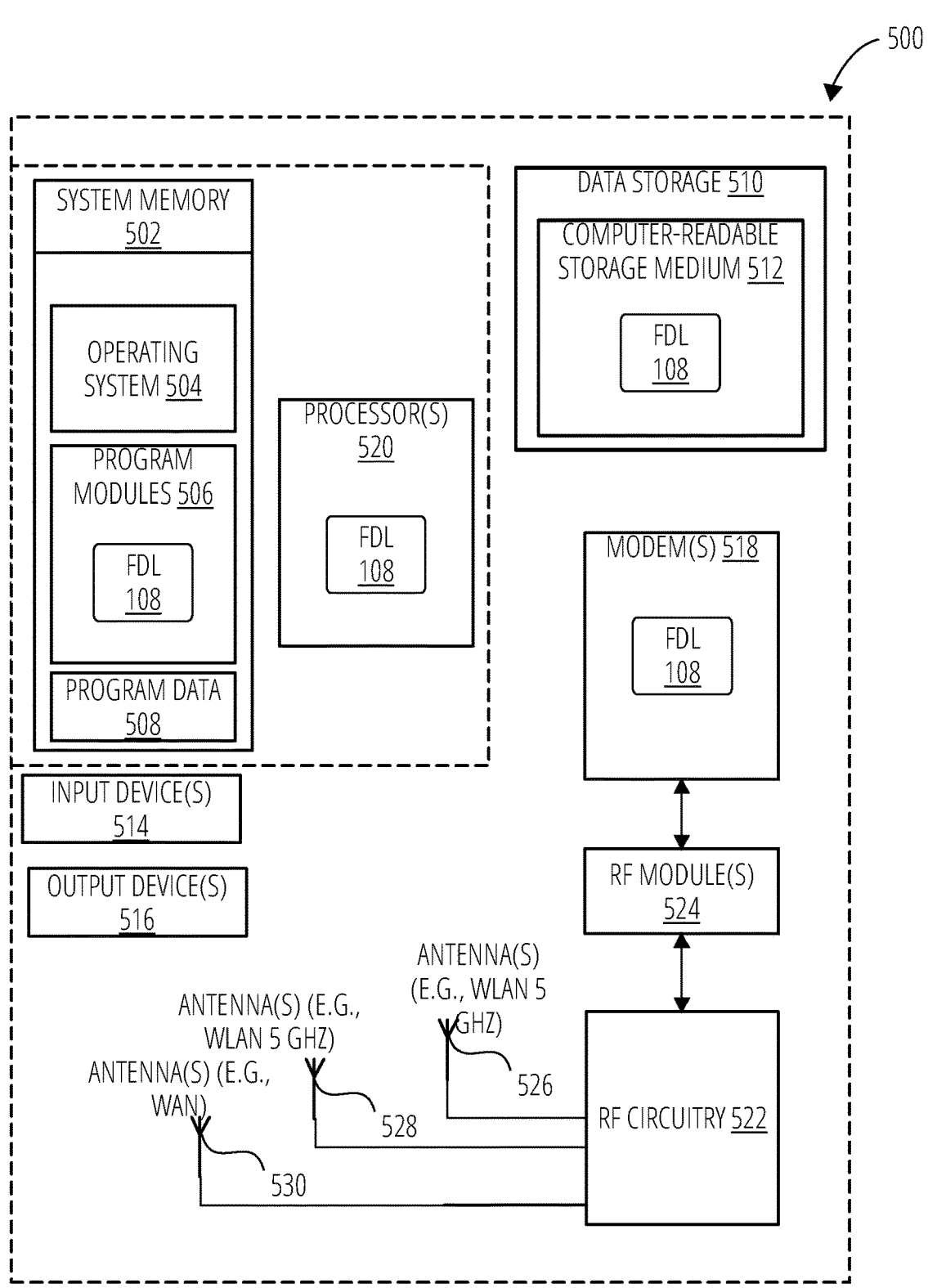
FIG. 5 is a block diagram of a wireless device with forwarding decision logic (FDL), according to one embodiment.

FIG. 5 is a block diagram of a wireless device 500 with FDL 108, according to one embodiment. In some embodiments, one or more of the nodes described above with respect to FIGS. 1-4 may include some or all of the features of the wireless device 500. In one embodiment, the wireless device 500 may be the same or similar to the nodes described above with respect to FIGS. 1-4. Alternatively, the wireless device 500 may be other electronic devices, as described herein.

The wireless device 500 includes one or more processor(s) 520, such as one or more CPUs, microcontrollers, field programmable gate arrays, or other types of processors. The wireless device 500 also includes system memory 502 operatively coupled to the one or more processor(s) 520, which may correspond to any combination of volatile and/or non-volatile storage mechanisms. The system memory 502 stores information that provides operating system 504, various program modules 506, program data 508, and/or other components. In one embodiment, the system memory 502 stores instructions of methods to control the operation of the wireless device 500. The wireless device 500 performs functions using the processor(s) 520 to execute instructions provided by the system memory 502. In one embodiment, the program modules 506 may include at least a portion of the FDL 108. The FDL 108 may perform some or all of the operations of the processes described herein.

The wireless device 500 also includes a data storage device 510 that may be composed of one or more types of removable storage and/or one or more types of non-removable storage. The data storage device 510 includes a computer-readable storage medium 512, on which is stored one or more sets of instructions embodying any of the methodologies or functions described herein. Instructions for the program modules 506 (e.g., the FDL 108) may reside, completely or at least partially, within the computer-readable storage medium 512, system memory 502, and/or within the processor(s) 520 during execution thereof by the wireless device 500, the system memory 502 and the processor(s) 520 also constituting computer-readable media. The wireless device 500 may also include one or more input devices 514 (keyboard, mouse device, specialized selection keys, etc.) and one or more output devices 516 (displays, printers, audio output mechanisms, etc.).

The wireless device 500 further includes a modem 518 to allow the wireless device 500 to communicate via wired connections (e.g., Ethernet) and wireless connections (e.g., provided by the wireless communication system) with other computing devices, such as remote computers, an item-providing system, and so forth. The modem 518 can be connected to one or more radio frequency (RF) modules 524. The RF modules 524 may be a wireless local area network (WLAN) module, a WAN module, a PAN module, a Global Positioning System (GPS) module, or the like. The antenna structures (antenna(s) 526, 528, 530,) are coupled to the RF circuitry 522, which is coupled to the modem 518. The RF circuitry 522 may include radio front-end circuitry, antenna switching circuitry, impedance matching circuitry, or the like. The antennas 526 may be GPS antennas, Near Field Communication (NFC) antennas, other WAN antennas, WLAN or PAN antennas, or the like. The modem 518 allows the wireless device 500 to handle both voice and non-voice communications (such as communications for text messages, multimedia messages, media downloads, web browsing, etc.) with a wireless communication system. The modem 518 may provide network connectivity using any type of mobile network technology, including, for example, cellular digital packet data (CDPD), general packet radio service (GPRS), EDGE, universal mobile telecommunications system (UMTS), 1 times radio transmission technology (1×RTT), evaluation data optimized (EVDO), high-speed down-link packet access (HSDPA), Wi-Fi®, Long Term Evolution (LTE) and LTE Advanced (sometimes generally referred to as 4G), etc.

The modem 518 may generate signals and send these signals to an antenna(s) 526 of a first type (e.g., WLAN 5 GHZ), antenna(s) 528 of a second type (e.g., WLAN 2.4 GHZ), and/or antenna(s) 530 of a third type (e.g., WAN), via RF circuitry 522, and RF module(s) 524 as descried herein. Antennas 526, 528, 530 may be configured to transmit in different frequency bands and/or using different wireless communication protocols. The antennas 526, 528, 530 may be directional, omnidirectional, or non-directional antennas. In addition to sending data, antennas 526, 528, 530 may also receive data, which is sent to appropriate RF modules connected to the antennas. One of the antennas 526, 528, 530 may be any combination of the antenna structures described herein.

In one embodiment, the wireless device 500 establishes a first connection using a first wireless communication protocol, and a second connection using a different wireless communication protocol. The first wireless connection and second wireless connection may be active concurrently, for example, if a network hardware device is receiving a media item from another network hardware device (e.g., a mini-POP node) via the first connection) and transferring a file to another electronic device (e.g., via the second connection) at the same time. Alternatively, the two connections may be active concurrently during wireless communications with multiple devices. In one embodiment, the first wireless connection is associated with a first resonant mode of an antenna structure that operates at a first frequency band, and the second wireless connection is associated with a second resonant mode of the antenna structure that operates at a second frequency band. In another embodiment, the first wireless connection is associated with a first antenna structure, and the second wireless connection is associated with a second antenna. In other embodiments, the first wireless connection may be associated with content distribution within mesh nodes of the wireless mesh network, and the second wireless connection may be associated with serving a content file to a client consumption device, as described herein.

Though a modem 518 is shown to control transmission and reception via the antenna(s) (526, 528, 530), the wireless device 500 may alternatively include multiple modems, each of which is configured to transmit/receive data via a different antenna and/or wireless transmission protocol.

In the above description, numerous details are set forth. It will be apparent, however, to one of ordinary skill in the art having the benefit of this disclosure, that embodiments may be practiced without these specific details. In some instances, well-known structures and devices are shown in block diagram form, rather than in detail, in order to avoid obscuring the description.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as "calculating," "detecting," determining," "generating," "communicating," "receiving," "disabling," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

Embodiments also relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, or any type of media suitable for storing electronic instructions.

The algorithms and displays presented herein are not inherently related to any particular computer or other apparatus. Various general-purpose systems may be used with programs in accordance with the teachings herein, or it may prove convenient to construct a more specialized apparatus to perform the required method steps. The required structure for a variety of these systems will appear from the description below. In addition, the present embodiments are not described with reference to any particular programming language. It will be appreciated that a variety of programming languages may be used to implement the teachings of the present invention as described herein. It should also be noted that the terms "when" or the phrase "in response to," as used herein, should be understood to indicate that there may be intervening time, intervening events, or both before the identified operation is performed.

It is to be understood that the above description is intended to be illustrative, and not restrictive. Many other embodiments will be apparent to those of skill in the art upon reading and understanding the above description. The scope of the present embodiments should, therefore, be determined with reference to the appended claims, along with the full scope of equivalents to which such claims are entitled.

What is claimed is:

1. A first node within a hybrid network, the first node comprising:

one or more processors; and one or more non-transitory computer readable media storing processor executable instructions which, when executed using the one or more processors, cause the first node to:

identify a network of nodes comprising the first node, the network organized as (i) a first virtual local area network (VLAN) having a first topology of wired and wireless connections within the network of nodes and (ii) a second VLAN having a second topology of wired and wireless connections within the network of nodes, wherein the wired and wireless connections being used for the first and second VLANs are organized into respective wired and wireless segments;

identify a first wireless segment corresponding to the first VLAN comprising a first set of nodes;

identify a first wired segment corresponding to the first VLAN comprising a second set of nodes;

determine a third set of nodes, both the first set of nodes and the second set of nodes comprising the third set of nodes, wherein the third set of nodes comprises the first node;

identify a second wireless segment corresponding to the second VLAN comprising a fourth set of nodes;

identify a second wired segment corresponding to the second VLAN comprising a fifth set of nodes;

determine a sixth set of nodes, the fourth set of nodes and the fifth set of nodes comprising the sixth set of nodes, wherein the sixth set of nodes comprises the first node;

receive, from a second node of the first wireless segment, a first undesignated frame comprising a first VLAN tag identifying the first VLAN;

determine, based on a first comparison of nodes of the third set of nodes, that the first node is to forward undesignated frames received from the first wireless segment;

forward the first undesignated frame across the first wired segment;

receive, from a third node of the second wireless segment, a second undesignated frame comprising a second VLAN tag identifying the second VLAN;

determine, based on a second comparison of nodes of the sixth set of nodes, that the first node is to forward undesignated frames received from the second wireless segment; and forward the second undesignated frame across the second wired segment.

2. The first node of claim 1, wherein the one or more non-transitory computer readable media store processor executable instructions which, when executed using the one or more processors, cause the first node to:

receive, from a fourth node of the first wired segment, a third undesignated frame comprising a third VLAN tag identifying the first VLAN;

determine, based on a third comparison of nodes of the third set of nodes, that the first node is to forward undesignated frames from the first wired segment;

forward the third undesignated frame across the first wireless segment;

receive, from a fifth node of the second wired segment, a fourth undesignated frame comprising a fourth VLAN tag identifying the second VLAN;

determine, based on a fourth comparison of nodes of the sixth set of nodes, that the first node is to forward undesignated frames received from the second wired segment, wherein a number of nodes belonging to the fifth set of nodes has changed between the second comparison and the fourth comparison; and forward the fourth undesignated frame across the second wireless segment.

3. The first node of claim 1, wherein the one or more non-transitory computer readable media store processor executable instructions which, when executed using the one or more processors, cause the first node to:

receive, from a fourth node of the first wired segment, a third undesignated frame comprising a third VLAN tag identifying the first VLAN;

determine, based on a third comparison of nodes of the third set of nodes, that the first node is not to forward undesignated frames received from the first wired segment, wherein a number of nodes belonging to the third set of nodes has changed between the first comparison and the third comparison; and drop the third undesignated frame.

4. An electronic device comprising:

one or more processors; and one or more non-transitory computer readable media storing processor executable instructions which, when executed using the one or more processors, cause the electronic device to;

identify one or more nodes of a network of nodes, the network of nodes organized as (i) a first virtual local area network (VLAN) having a first topology of wired and wireless connections within the network of nodes and (ii) a second VLAN having a second topology of wired and wireless connections within the network of nodes;

wirelessly receive a first undesignated frame corresponding to the first VLAN;

determine that a first identifier indicates that the electronic device is to forward wirelessly received undesignated frames corresponding to the first VLAN;

forward the first undesignated frame across a first wired connection corresponding to the first VLAN;

wirelessly receive a second undesignated frame corresponding to the second VLAN;

determine that a second identifier indicates that the electronic device is to forward wirelessly received undesignated frames corresponding to the second VLAN; and forward the second undesignated frame across a second wired connection corresponding to the second VLAN.

5. The electronic device of claim 4, wherein the one or more non-transitory computer readable media store processor executable instructions which, when executed using the one or more processors, cause the electronic device to:

receive, from a second node on the first wired connection, a third undesignated frame corresponding to the first VLAN;

determine that a third identifier indicates that the electronic device is to forward undesignated frames received from the first wired connection; and forward the third undesignated frame across a first wireless connection corresponding to the first VLAN.

6. The electronic device of claim 4, wherein the one or more non-transitory computer readable media store processor executable instructions which, when executed using the one or more processors, cause the electronic device to:

receive, from a second node on the first wired connection, a third undesignated frame corresponding to the first VLAN;

determine that a third identifier indicates that the electronic device is not to forward undesignated frames received from the first wired connection; and drop the third undesignated frame.

7. The electronic device of claim 4, wherein the one or more non-transitory computer readable media store processor executable instructions which, when executed using the one or more processors, cause the electronic device to:

identify a first set of nodes connected by a first set of wireless connections, the first set of wireless connections corresponding to the first VLAN;

identify a second set of nodes connected by a first set of wired connections comprising the first wired connection, the first set of wired connections corresponding to the first VLAN;

determine a third set of nodes, wherein both the first set of nodes and the second set of nodes comprise the third set of nodes;

identify a fourth set of nodes connected by a fourth set of wireless connections, the fourth set of wireless connections corresponding to the first VLAN;

identify a fifth set of nodes connected by a fifth set of wired connections comprising the first wired connection, the fifth set of wired connections corresponding to the first VLAN; and determine a sixth set of nodes, wherein both the fourth set of nodes and the fifth set of nodes comprise the sixth set of nodes.

8. The electronic device of claim 7, wherein the one or more non-transitory computer readable media store processor executable instructions which, when executed using the one or more processors, cause the electronic device to:

generate, by comparing metrics corresponding to nodes the third set of nodes, the first identifier; and generate, by comparing metrics corresponding to nodes of the sixth set of nodes, the second identifier.

9. The electronic device of claim 4, wherein a first set of nodes is connected to the electronic device via a first set of wired connections corresponding to the first VLAN comprising the first wired connection, and wherein a second set of nodes is connected to the electronic device via a second set of wired connections corresponding to the second VLAN comprising the second wired connection.

10. The electronic device of claim 9, wherein the first set of nodes comprises the second set of nodes and a third set of nodes, wherein the second and third sets of nodes are separated by an Ethernet switch that (i) forwards frames corresponding to the first VLAN and (ii) drops frames corresponding to the second VLAN.

11. The electronic device of claim 4, wherein the electronic device receives the first undesignated frame via a first wireless connection corresponding to the first VLAN to a second node, and wherein the one or more non-transitory computer readable media store processor executable instructions which, when executed using the one or more processors, cause the electronic device to:

determine that a third node is wirelessly connected to the second node via a second wireless connection corresponding to the first VLAN; and generate, in response to determining that the third node is wirelessly connected to the second node via the second wireless connection, a third identifier indicating that the electronic device is not to forward wirelessly received undesignated frames across the first wired connection.

12. A method, comprising:

identifying one or more nodes of a network of nodes, the network of nodes organized as (i) a first virtual local area network (VLAN) having a first topology of wired and wireless connections within the network and (ii) a second VLAN having a second topology of wired and wireless connections within the network;

wirelessly receiving, by a first node of the network of nodes, a first undesignated frame corresponding to the first VLAN;

forwarding, in response to a determination that a first identifier indicates that the first node is to forward wirelessly received undesignated frames corresponding to the first VLAN, the first undesignated frame across a first wired connection corresponding to the first VLAN;

wirelessly receiving, by the first node, a second undesignated frame corresponding to the second VLAN; and forwarding, in response to a determination that a second identifier indicates that the first node is to forward wirelessly received undesignated frames corresponding to the second VLAN, the second undesignated frame across a second wired connection corresponding to the second VLAN.

13. The method of claim 12, further comprising:

receiving, from a second node on the first wired connection, a third undesignated frame corresponding to the first VLAN; and forwarding, in response to a determination that a third identifier indicates that the first node is to forward undesignated frames received from the second node, the third undesignated frame across a first wireless connection corresponding to the first VLAN.

14. The method of claim 12, further comprising:

receiving, from a second node on the first wired connection, a third undesignated frame corresponding to the first VLAN; and not forwarding, in response to a determination that a third identifier indicates that the first node is not to forward undesignated frames received from the second node, the third undesignated frame.

15. The method of claim 12, further comprising:

identifying a first set of nodes connected by a first set of wireless connections, the first set of wireless connections corresponding to the first VLAN;

identifying a second set of nodes connected by a first set of wired connections comprising the first wired connection, the first set of wired connections corresponding to the first VLAN;

determining a third set of nodes, wherein both the first set of nodes and the second set of nodes comprise the third set of nodes;

identifying a fourth set of nodes connected by a fourth set of wireless connections, the fourth set of wireless connections corresponding to the first VLAN;

identifying a fifth set of nodes connected by a fifth set of wired connections comprising the first wired connection, the fifth set of wired connections corresponding to the first VLAN; and determining a sixth set of nodes, wherein both the fourth set of nodes and fifth set of nodes comprise the sixth set of nodes.

16. The method of claim 15, wherein the third set of nodes comprises the first node, and wherein the sixth set of nodes comprises the first node.

17. The method of claim 15, further comprising:

generating, by comparing metrics corresponding to nodes the third set, the first identifier; and generating, by comparing metrics corresponding to nodes of the sixth set, the second identifier.

18. The method of claim 12, wherein a first set of nodes is connected to the first node via a first set of wired connections corresponding to the first VLAN comprising the first wired connection, and wherein a second set of nodes is connected to the first node via a second set of wired connections corresponding to the second VLAN comprising the second wired connection.

19. The method of claim 18, wherein the first set of nodes comprises the second set of nodes and a third set of nodes, wherein the second and third sets of nodes are separated by an Ethernet switch that (i) forwards frames corresponding to the first VLAN and (ii) drops frames corresponding to the second VLAN.

20. The method of claim 12, wherein the first node receives the first undesignated frame via a first wireless connection corresponding to the first VLAN to a second node, and wherein the method further comprises generating, in response to a determination that a third node is wirelessly connected to the second node via a second wireless connection corresponding to the first VLAN, a third identifier indicating that the first node is not to forward wirelessly received undesignated frames across the first wired connection.

* * * * *